(12) United States Patent
Ozawa

(10) Patent No.: US 6,244,915 B1
(45) Date of Patent: *Jun. 12, 2001

(54) FUEL SYSTEM AND ARRANGEMENT FOR SMALL WATERCRAFT

(75) Inventor: Shigeyuki Ozawa, Iwata (JP)

(73) Assignee: Yamaha Hatsudoki Kabushiki Kaisha, Iwata (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,486

(22) Filed: Mar. 2, 1998

Related U.S. Application Data

(63) Continuation-in-part of application No. 08/998,643, filed on Dec. 29, 1997, now Pat. No. 6,015,321, and a continuation-in-part of application No. 08/777,484, filed on Dec. 30, 1996, now Pat. No. 5,902,158.

(30) Foreign Application Priority Data

Feb. 28, 1997 (JP) .................................................. 9-045856

(51) Int. Cl.[7] ............................ B63H 21/10; B63H 21/38
(52) U.S. Cl. .............................................................. 440/88
(58) Field of Search ............................... 114/55.5, 55.51, 114/55.57; 440/88, 89; 123/495, 514

(56) References Cited

U.S. PATENT DOCUMENTS

| | | | |
|---|---|---|---|
| 3,948,206 | * 4/1976 | Tyler | ...................... 115/70 |
| 4,416,638 | * 11/1983 | Ellis | ........................ 440/88 |
| 5,022,355 | 6/1991 | Billingsley et al. . | |
| 5,197,436 | 3/1993 | Ozawa . | |
| 5,231,958 | * 8/1993 | Takahashi et al. | ...................... 123/73 |
| 5,241,931 | 9/1993 | Radel . | |
| 5,259,352 | 11/1993 | Gerhardy et al. . | |
| 5,353,760 | * 10/1994 | Zager | ................................ 123/196 S |
| 5,367,998 | 11/1994 | Shiohara et al. . | |
| 5,429,095 | 7/1995 | Aodai et al. . | |
| 5,732,685 | 3/1998 | Nakamura . | |
| 5,902,158 | * 5/1999 | Nakase et al. | .......................... 440/88 |
| 6,015,321 | * 1/2000 | Ozawa et al. | ........................... 440/88 |

\* cited by examiner

*Primary Examiner*—S. Joseph Morano
*Assistant Examiner*—Andrew Wright
(74) *Attorney, Agent, or Firm*—Knobbe, Martens, Olson & Bear, LLP

(57) ABSTRACT

A small watercraft includes an improved fuel supply system that is configured and arranged to provide a compact engine design while promoting air cooling of at least a portion of the fuel supply system. In one mode, a fuel pump of the system is at least partially located within an air flow path between an outlet of an air duct and an inlet of the engine induction system. The air flow cools the fuel pump to reduce its operating temperature. As a result, the durability and performance of the fuel pump is improved despite the fuel pump lying in close proximity to the engine's exhaust system. Shock-absorbent mounts also couple at least a portion of the fuel supply system (e.g., the fuel pump and a fuel delivery rail) to the hull of the watercraft. These fuel system components consequently experience lessened impact when the watercraft skips over the body of water on which it is planing, and are thus less susceptible to breakage.

37 Claims, 10 Drawing Sheets

FUEL SYSTEM AND ARRANGEMENT FOR SMALL WATERCRAFT

PRIORITY INFORMATION

This application is a continuation-in-part of Ser. No. 08/777,484 U.S. Pat. No. 5,902,158, filed Dec. 30, 1996, and Ser. No. 08/998,643 U.S. Pat. No. 6,015,321, filed Dec. 29, 1997.

BACKGROUND OF THE INVENTION

1. Field of the Invention

The present invention relates in general to an engine, and in particular to a fuel system and arrangement for a marine engine.

2. Description of Related Art

Personal watercraft have become popular in recent years. This type of watercraft is sporty in nature; it turns swiftly, is easily maneuverable, and accelerates quickly. Personal watercraft today commonly carry one rider and one or two passengers.

A relatively small hull of the personal watercraft commonly defines a rider's area above an engine compartment. An internal combustion engine frequently powers a jet propulsion unit which propels the watercraft. A plurality of engine mounts support the engine within the engine compartment in front of a tunnel formed on the underside of the watercraft. The jet propulsion unit is located within the tunnel and is driven by a drive shaft connected to the engine.

Personal watercraft often employ an inline, multi-cylinder, crankcase compression, two-cycle engine. The engine conventionally lies within the engine compartment with the in-line cylinders aligned along a longitudinal axis of the watercraft hull. An exhaust system communicates with the cylinders of the engine and extends to a discharge that is located near the stem of the watercraft. In this manner, exhaust gases are expelled from the watercraft's and the engine compartment.

Air must be supplied to the engine from outside the hull for use in the combustion process. Typically, air flows through one or more ducts in the hull into the engine compartment, and then through an intake system of the engine to combustion chambers of the engine.

Fuel is also supplied to the engine for use in the combustion process. In order to accurately meter the fuel and improve engine operating efficiency and performance, fuel injectors can be used to inject fuel into the combustion chambers or to form a fuel/air charge before such charge enters the combustion chambers. Each injector has an electrically-operated valve which selectively opens and closes, controlling the flow of fuel through the injectors to the engine. Typically, a high pressure fuel pump is used to supply pressurized fuel to each fuel injector via a fuel rail. The fuel system continuously supplies fuel from a fuel tank to the fuel injectors while returning excess fuel to the fuel tank through a return line.

In order to keep the size of the watercraft small and center of gravity low, the engine compartment is made very small, thus necessitating that the engine be compact. One problem with this arrangement is that hot exhaust gases flowing through the exhaust system may be routed very close to other components of the engine, damaging them or resulting in their poor performance. This is true for the fuel pump where the heat from the exhaust system may damage the fuel pump or shorten its useful life. Elevation of the fuel temperate within the delivery and return lines, as well as within the fuel pump, can also affect the fuel air ratio of the charge formed by the fuel injectors.

Some prior watercraft have increased the width of the watercraft in order to separate the fuel supply system from the exhaust system. Such watercraft, however, sacrifice the handling performance of the watercraft due to the resulting wider hull; the wider hull can not turn as sharp.

Moreover, the associated engines have also employed a wider width in order to provide a component arrangement wherein the position of the fuel rail is positioned on one side of the engine, away from the exhaust system, in a suspended position. However, due to the sporty nature of the watercraft, the fuel supply pipe experiences vigorous impact as the watercraft jumps and lands when speeding across the body of water in which it is operated. The high pressure fuel supply pipe thus can be damaged when supported in this position and directly mounted to the hull.

SUMMARY OF THE INVENTION

One aspect of the present invention involves arranging the components of the fuel supply system to provide a compact engine while promoting air cooling of at least a portion of the fuel supply system. In one mode, the small watercraft has a hull defining an engine compartment. An internal combustion engine is located within the engine compartment and drives a propulsion device carried by the hull. At least one air duct communicates with the engine compartment through at least one outlet opening. An induction system is connected to the engine and includes an air inlet. A fuel supply system includes a fuel delivery line and a fuel return line that communicate with a fuel tank and together define a fuel loop. A fuel rail communicates with the fuel loop and with a plurality of fuel injectors mounted in the engine, and the fuel delivery and return lines are arranged within the hull of the watercraft such that at least a portion of one of the lines extends between the air duct outlet end and the air inlet of the induction system. In this manner, at least a portion of the fuel supply system is air cooled in order to position portions of the fuel supply system in relatively close proximity to the engine's exhaust system while reducing the effect of heat on the fuel supply system.

An additional aspect of the present invention involves reducing the impact experienced by at least some components of the fuel supply system when the watercraft skips over the body of water on which is it planing. In one mode, the small watercraft comprises a hull defining a rider's area behind a bow of the hull. The rider's area is sized to accommodate at least one rider. An internal combustion engine is located in an engine compartment defined within the hull. The engine includes an output shaft that drives a drive shaft of a propulsion device of the watercraft, and a fuel supply system. The fuel supply system includes a fuel tank connected to a fuel delivery line and to a fuel return line that together define a fuel loop. A fuel pump communicates with the fuel loop and is mounted on the engine. A fuel rail communicates with the fuel pump and with a plurality of fuel injectors mounted in the engine. At least a portion of the fuel delivery line and/or the fuel pump is coupled to the hull by a plurality of shock-absorbent mounts that lie between the hull and these components of the fuel system. The mounts reduce the amount of shock experienced by the fuel pump and/or a portion the fuel delivery line as the watercraft bounces across the body of water when in use. In a more preferred mode, the mounts are engine mounts that support the engine within the engine compartment of the watercraft hull.

Further aspects, features, and advantages of the present invention will become apparent from the detailed description of the preferred embodiments which follow.

BRIEF DESCRIPTION OF THE DRAWINGS

The above-mentioned and other features of the invention will now be described with reference to the drawings of preferred embodiments of the present watercraft. The illustrated embodiments are intended to illustrate, but not to limit the invention. The drawings contain the following figures.

DETAILED DESCRIPTION OF PREFERRED EMBODIMENTS OF THE INVENTION

The present fuel supply system and its arrangement on an engine have particular utility for use with personal watercraft, and thus, the following describes the fuel supply system in the context of a personal watercraft. This environment of use, however, is merely exemplary. The present fuel supply system can be readily adapted by those skilled in the art for use with other types of marine engines as well, such as, for example, but without limitation, small jet boats and the like. The fuel supply system may also be adapted for use with internal combustion engines that are used in other applications.

Before describing the present fuel supply system, an exemplary personal watercraft 10 will first be described in general details to assist the reader's understanding of the environment of use and the operation of the exhaust system. The watercraft 10 is suited for movement through a body of water W in a direction Fr (toward a front end or bow of the watercraft).

Figure 1:
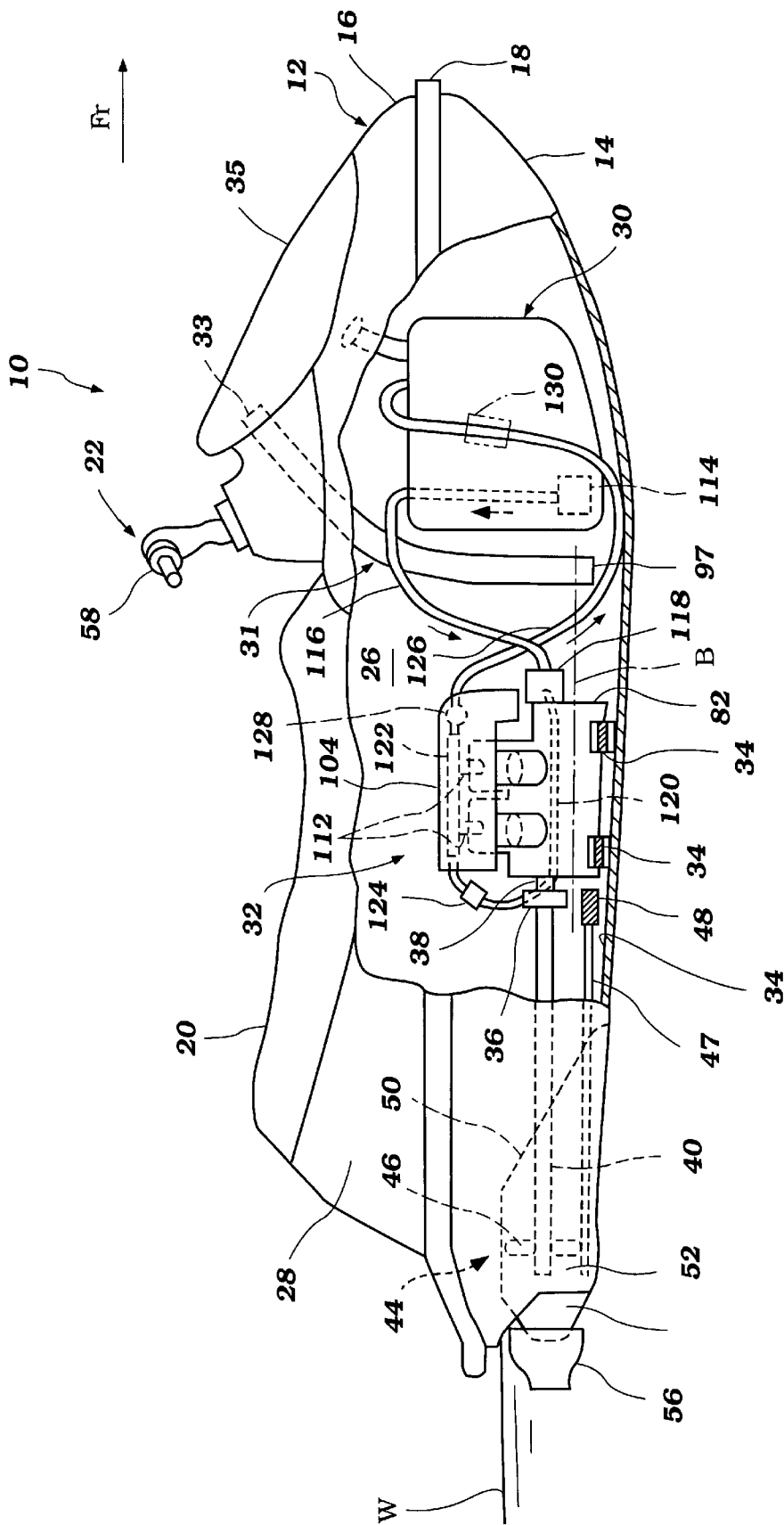
FIG. 1 is a side elevational view of the small watercraft that is partially sectioned to illustrate an engine and a fuel supply system that are configured and arranged in accordance with a preferred embodiment of the present invention.
Figure 2:
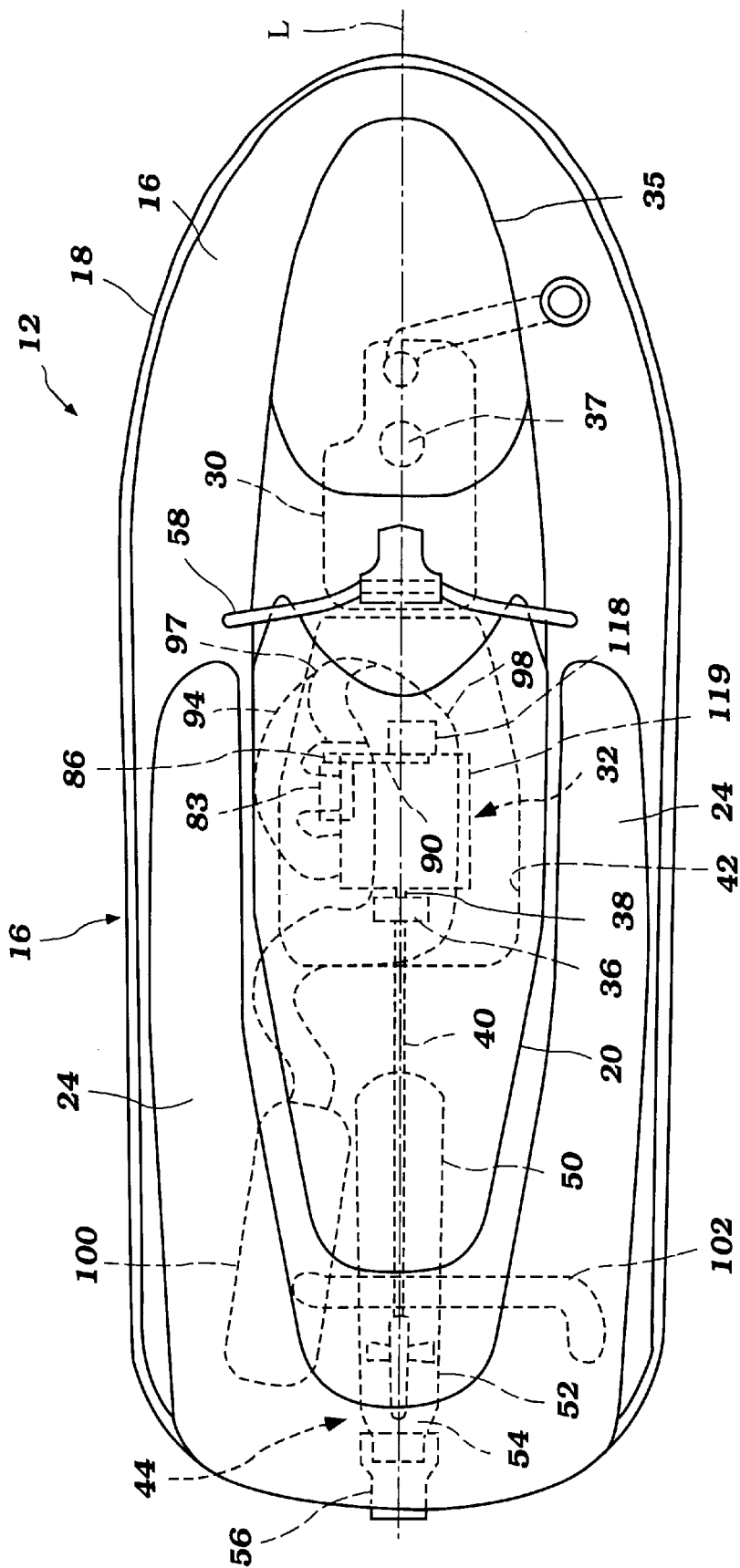
FIG. 2 is a top plan view of the watercraft of FIG. 1 and illustrates in phantom the engine and several other internal components of the watercraft.

As illustrated in FIGS. 1 and 2, the watercraft 10 includes a hull 12 formed by a lower hull section 14 and an upper deck section 16. The hull sections 14, 16 are formed from a suitable material such as, for example, a molded fiberglass reinforced resin. The lower hull section 14 and the upper deck section 16 are fixed to each other around the peripheral edges 18 in any suitable manner.

A passenger seat 20 is provided proximate to the stern of the hull 12 as shown in FIGS. 1 and 2. The passenger seat 20 is mounted longitudinally along the center of the watercraft 10. In the illustrated embodiment, the seat 20 has a longitudinally extended straddle-type shape which may be straddled by an operator and by at least one or two passengers. Although not illustrated, the seat 20 can be formed by two separate sections: a front seat section and a rear seat section. The front seat section of the seat 20 lies proximate to the controls 22 of the watercraft 10 which generally lie at about the longitudinal center of the watercraft 10. This position of the operator on the watercraft 10 gives the watercraft 10 fore and aft balance when the operator rides alone. The rear seat section is configured to allow one or two passengers to be comfortably seated behind the operator of the watercraft 10. The sections of the seat 20 desirably are removable and are attached to the upper deck 12 by known latching mechanisms.

As seen in FIG. 2, the upper deck section 16 of the hull 12 advantageously includes at least a pair of foot areas 24. The foot areas 24 extend generally longitudinally and parallel to the sides of the elongated seat 20 so that the operator and any passengers sitting on the seat 20 can place their feet in the foot areas 24. A non-slip surface (not shown) is located in the foot areas 24 to provide increased grip and traction for the operator and the passengers.

The lower hull section 14 of the personal watercraft 10 includes a forward compartment 26 (i.e., an engine compartment) and a rear compartment 28 as shown in FIGS. 1 and 2. In the exemplary watercraft depicted in FIG. 1, a fuel tank 30 and a buoyant block (not illustrated) are located in the forward compartment 26. The fuel tank 30 is mounted to the bottom surface of the hull using a plurality of fuel tank mounts 29. The plurality of mounts secure the fuel tank 30 within the hull. The fuel tank mounts 29 are preferably rubber or a similar vibration dampening or isolating material. The buoyant block affords additional buoyancy to the watercraft 10.

An air supply system ventilates at least the forward compartment 26 and supplies fresh air to the compartment 26. The air supply system desirably includes at least one air duct 31, and preferably at least two (although only one is illustrated in the figures for simplicity). One air duct 31 is located toward a forward section of the front compartment 26. The duct includes an upper end 33 positioned within an intake plenum chamber that is formed under a hatch 35. The duct 31 extends downward from its upper end 33 and terminates at a lower outlet opening 37 formed at a lower end of the duct 31. In the illustrated embodiment, the lower outlet opening 37 lies near a bottom surface 39 of the forward compartment 26.

An internal combustion engine 32 powers the watercraft 10. As depicted in FIGS. 1 and 2, the engine 32 is contained within the front or engine compartment 26 and is mounted primarily beneath the forward portion of the seat 20. A bracket 41 extends outwardly from each side of the cylinder block 60 of the engine 32 near the bottom thereof and between its ends. The brackets rest upon a pad 43 of the respective side engine mounts 34. The engine mounts 34 secure the engine 32 to the hull lower portion 14.

Each side engine mount 34 preferably comprises a pad connected to a shaft (not shown) which engages the hull of the watercraft via the engine support 45. The pad is preferably constructed from rubber or a similar vibration dampening and isolating material. The pad is positioned at the top end of the shaft, the shaft being threaded on an outer surface over at least a section between its ends. The engine mounts 34, with shock-absorbent pads, dampen engine vibrations, as well as reduce the impact felt by engine components as the hull 12 of the watercraft 10 bounces on the surface of the body of water in which the watercraft is used, when in use.

Means are provided for raising and lowering the height of the engine with respect to the hull. Preferably, this means causes the engine to be lowered between the pad and the hull, and not between the engine and the pad or mount. The engine 32 is desirably mounted in approximately a central position in the watercraft 10 and beneath an access opening 42, which is located beneath and closed by the rider's seat 20.

As seen in FIG. 1, a coupling 36 interconnects an engine output shaft 38 to an impeller shaft 40. The impeller shaft 40 extends rearward through a bulkhead and a protective sleeve (not shown), to a jet propulsion unit 44 and drives an impeller 46 of the unit. A bearing assembly (not shown), which is secured to the bulkhead, supports the impeller shaft 40 behind the shaft coupling 36.

The jet propulsion unit 44 is positioned in a tunnel in the rear center of the lower hull section 14. The propulsion unit 44 includes a gullet 50 having an inlet opening formed on the bottom side of the lower hull section 14. The gullet 50 extends from the inlet opening to a pressurization chamber 52. The pressurization chamber 52 in turn communicates with a nozzle section 54 of the propulsion unit 44. A ride plate covers a portion of the tunnel behind the gullet 50 inlet to enclose the propulsion unit 44 and the nozzle 54 within the tunnel. In this manner, the lower opening of the tunnel is closed by the front edge of the gullet 50 and the ride plate.

The jet propulsion unit has a rotating impeller 46, which the impeller shaft 40 drives. The impeller 46 pressurizes the water within the pressurization chamber 52 and forces the pressurized water through the nozzle 54 section of the jet propulsion unit. A steering nozzle 56 directs the exit direction of the water stream exiting the jet propulsion unit 44. The steering nozzle 56 is pivotally supported at the rear of the jet propulsion unit 44 to change the thrust angle on the watercraft 10 for steering purposes as is known in the art.

The steering nozzle 56 is connected to a steering handle 58. The steering handle 58 forms part of the operator controls 22 which are mounted in front of the operator seat 20 as noted above. The steering handle 58 also can include a throttle control for controlling the speed of the engine.

The impeller 46 is located toward the front end of the pressurization chamber 52. A central support (not shown) supports the rear end of the impeller shaft 40 behind the impeller 46 and generally at the center of the pressurization chamber 52. A bearing assembly (not shown) journals the rear end of the impeller shaft 40 within the support.

A water removal assembly is in fluid communication with the tunnel or a portion of the nozzle section 54 of the propulsion unit 44. Desirably, the water removal assembly is a bilge system. The bilge system in the illustrated embodiment employs a conduit 47 which is in fluid communication with a portion of the nozzle section 54 of the propulsion unit 44. Due to the high rate of water flow through the nozzle section, a venturi effect is created. The venturi effect creates a suction which pulls water from the conduit 47 into the propulsion unit 44. The conduit 47 is connected to a bilge inlet 48 provided in the engine compartment 26 adjacent the engine 32 and near the bilge 39. As illustrated in FIG. 1, the bilge intake 48 is arranged to be slightly elevated from the bottom surface 39 of the hull of the forward compartment 26.

Alternatively, the bilge system can be equipped with a pump. The pump receives water from the bilge region of the hull and transfers it to the conduit. The water is then forced through the conduit to an outlet located near the stem of the watercraft. For example, the water may be expelled through an outlet located in a wall of the tunnel.

Figure 3:
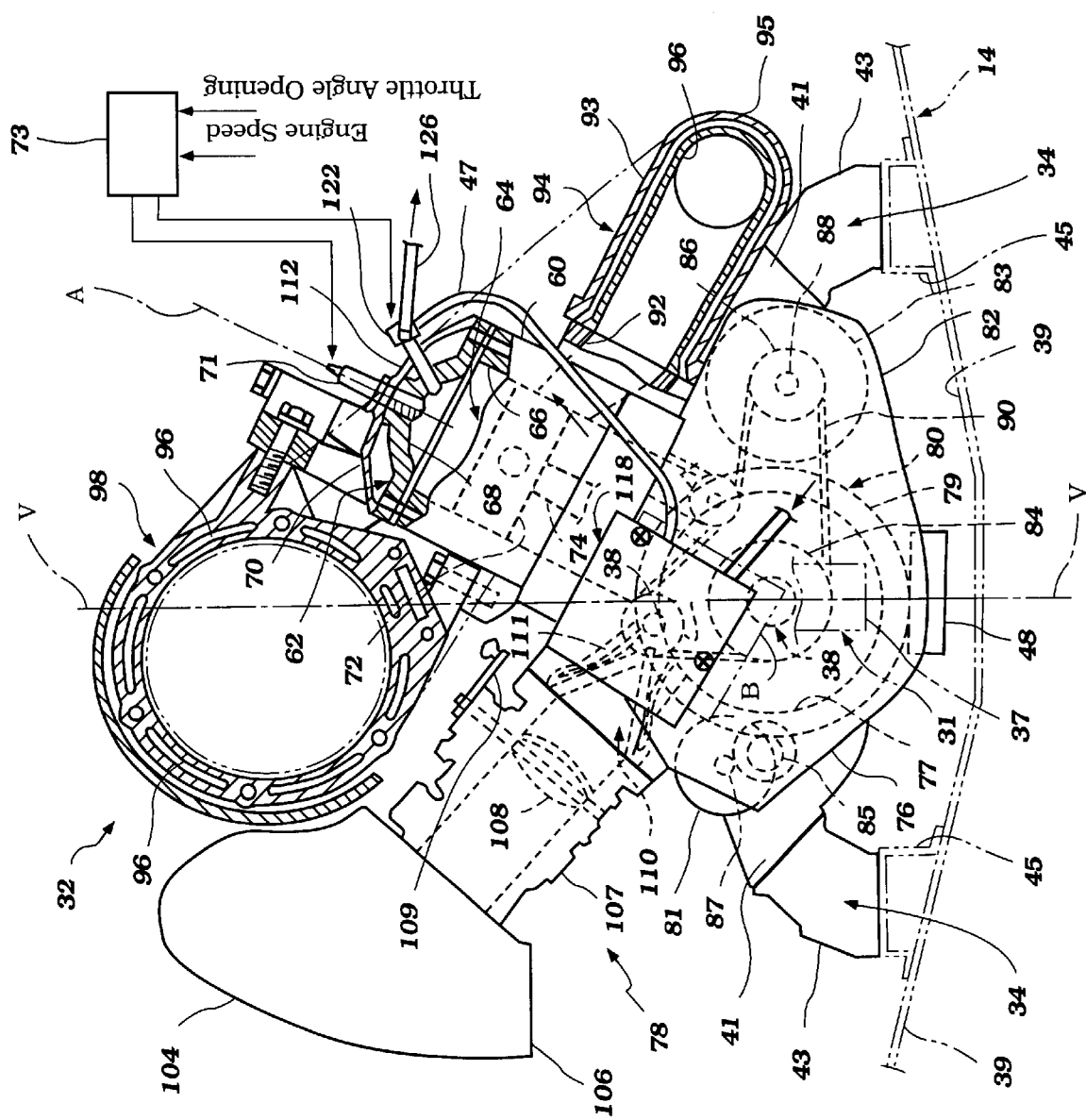
FIG. 3 is a front elevational view of the engine of FIG. 1 with several internal components of the engine illustrated in phantom, and illustrates portions of an associated exhaust system in cross section.

With reference now to FIGS. 1 through 3, the engine 32 in the illustrated embodiment includes two in-line cylinders and operates on a two-stroke compression principle. This engine type, however, is merely exemplary. Those skilled in the art will readily appreciate that the illustrated exhaust system can be used with any of a variety of engine types having other number of cylinders, having other cylinder arrangements and operating on other combustion principles (e.g., four-stroke principle). As shown in FIG. 3, the illustrated engine 32 is positioned such that the row of cylinders lies inclined to a longitudinal vertical plane, V, of the watercraft 10. The illustrated engine 32 is desirably inclined such that a center axis of the cylinders is skewed to the longitudinal vertical plane, V. The illustrated engine 32 also extends substantially longitudinally; notably, the engine 34 can also be arranged with the output shaft oriented in a generally lateral direction.

As best shown in FIG. 3, a cylinder block 60 and a cylinder head assembly 62 desirably form the cylinders 64 of the engine 32. In particular, the engine 32 desirably includes a cylinder block 60 assembly that defines a pair of parallel cylinder bores 66 formed by cylinder liners (not shown). Each cylinder liner is cast or pressed in place in a cylinder block 60.

The cylinder head assembly 62 defines a plurality of recesses 68 which cooperates with the cylinder bores 66 to form respective combustion chambers. The upper end of the cylinder head is sealed by a cover 70 that is affixed to the cylinder head in any suitable manner.

A spark plug 71 is mounted atop each recess of the cylinder head assembly 62 and has its gap extending into the combustion chamber. The spark plugs are fired by an ignition control unit that is controlled by an electronic control unit (ECU) of the engine, which are schematically illustrated in FIG. 3 and identified collectively by reference numeral 73.

Pistons 72 reciprocate within the cylinders 64 of the engine 32 and are pivotally connected to the small ends of connecting rods 74 by means of piston pins. The big ends of the connecting rods 74 in turn are connected to throws of a crankshaft, which in the illustrated embodiment also functions as the engine output shaft 38. Thus, the pistons 72 drive the crankshaft 38 through the connecting rods 74. The crankshaft 38 desirably is journaled to rotate about a rotational axis within a crankcase 76, which in the illustrated embodiment is located beneath the cylinder block 60.

The crankshaft 38 carries a flywheel assembly on the front end of the shaft 38 at a position forward of the row of cylinders. The flywheel assembly includes a flywheel magneto 80. With reference to FIG. 3, a magneto-generator assembly is attached to one end of the output shaft. The magneto-generator assembly includes a rotor that is keyed to the end of the crankshaft and is secured thereto by a nut.

A flywheel magneto 80 carries a plurality of permanent magnets on its inner periphery. The magnets cooperate with coils of an ignition system, as described below. A ring gear 79 is also attached to the flywheel 80. The ring gear 79 is selectively engaged with the pinion 81 of a starter motor. The pinion 81 and the ring gear 79 interact through an idler gear 85. The pinion 81 is engaged with an output shaft 87 of the starter motor upon starting the engine. Once started, the pinion 81 is disengaged from the starter motor and the output shaft 87 of the start motor spins freely. A cover 82 is attached to the front end of the cylinder block and cylinder head to enclose the flywheel assembly.

As seen in FIG. 3, the crankshaft 38 drives a generator 83 (e.g., an alternator) to produce electricity for the watercraft. For this purpose, the output shaft 38 carries a drive pulley 84 at a position between the coupling 36 and a rear surface of the engine 32. Alternatively, an intermediate shaft can connect the output shaft to the coupling and carry the drive pulley. The generator 83 includes a pulley 86 coupled to an input shaft 88. The engine output shaft and the generator input shaft 88 lie in parallel, and the generator pulley 86 lies within the same transverse plane as the drive pulley 84, and desirably lies directly above the drive pulley 84. A belt interconnects together the drive pulley 84 and the generator pulley 86 such that the drive pulley 84 drives the generator pulley 86, i.e., the two pulley rotate together.

The crankshaft 38 desirably is journaled within the crankcase 76, which in the illustrated embodiment is formed between a crankcase member and a lower end of the cylinder block. Individual crankcase chambers 77 of the engine are formed within the crankcase 76 by dividing walls and sealing disks, and are sealed from one another with each crankcase chamber 77 communicating with a dedicated variable-volume chamber. Each crankcase chamber 77 also communicates with an intake pipe of an induction system (which is described in detail below) through a check valve (e.g., reed-type valve) 110.

One or more scavenge passages (not shown) are desirably formed within each cylinder. Each scavenge passage includes an inlet port which is disposed in the lower end of the bore and opens to the crankcase chamber, and an outlet port which is disposed at a longitudinal position along the bores that is slightly below and on the opposite side of the exhaust passage and opens to the combustion chamber formed in an upper region of each cylinder.

A cooling system is provided to cool both the engine and the exhaust system which will be described below. The cooling system desirably uses a coolant such as, for example, water obtained from the operating environment. Water may be obtained from the pressurization chamber of the propulsion unit to circulate throughout the engine and exhaust system water jackets. The water jackets, as will be described below, substantially envelope a portion of the exhaust system and are integrated into a portion of the cylinder block. Generally, the water jackets are flow passages for the coolant. The coolant may be forced through the water jackets under pressure as described above; alternatively, a mechanical or electrical pump may be utilized to circulate the coolant.

An exhaust system is provided to discharge exhaust byproducts from the engine 32 to the atmosphere and/or to the body of water in which the watercraft 10 is operated. The exhaust system includes an exhaust manifold 94 that is affixed to the side of the cylinder block 60 and which receives exhaust gases from the variable-volume chambers through exhaust port 92. The manifold 94 is comprised of individual exhaust branch pipes 93 which extend outward from the cylinder block 60 to a merge portion 95 of the manifold 94. Each of the branch pipes and the merge portions have an exhaust passage therethrough. The passage leading through each of the branch pipes aligns with one of exhaust passages leading through the cylinder block from a cylinder. The merge portions 95 extend toward an exhaust manifold outlet. As mentioned before, the merge portion has a passage through which the exhaust is routed.

An outlet end of the exhaust manifold 94 communicates with a C-shaped pipe section. The C-pipe includes an inner tube that communicates directly with the discharge end of the exhaust manifold 92. An outer tube surrounds the inner tube to form a coolant jacket 96 between the inner and outer tubes. Although not illustrated, the C-pipe includes an inlet port positioned near its inlet end. The inlet port communicates with a water jacket of the engine.

The outlet end of the C-pipe communicates with an exhaust chamber 98. In the illustrated embodiment, the exhaust chamber 98 is an expansion chamber and has a tubular shape in which an expansion volume is defined within an annular, thick wall. Coolant jacket passages extend through the expansion chamber wall and communicate with the coolant jacket of the C-pipe.

A flexible coupling 97 connects the outlet end of the C-pipe to the inlet end of the expansion chamber 98. The flexible coupling 97 also can include an outlet port which communicates with an internal coolant passage within the flexible coupling. The coolant passage places the coolant jacket and the coolant passages in communication.

The outlet end of the expansion chamber is fixed to reducer pipe which tapers in diameter toward its outlet The pipe has a dual shell construction formed by an inner shell which defines an exhaust flow passage. The expansion volume communicates with this passage.

An outlet shell is connected to the inner shell and defines a cooling jacket about the inner shell. The coolant jacket passages of the expansion chamber communicate with the coolant jacket of the pipe to discharge a portion of the coolant with the exhaust gases.

A catalyzer can be disposed within the space defined at the mating ends of the expansion chamber and the reducer pipe. For instance, the catalyzer can include an annular shell supporting a honeycomb-type catalyst bed. The catalyst bed is formed of a suitable catalytic material such as that designed to treat and render harmless hydrocarbons, carbon monoxide, and oxides of nitrogen. An annual flange supports the annular shell generally at the center of the flow path through the expansion chamber volume. In this manner, all exhaust gas flow through the expansion chamber passes through the catalyst bed. The annular flange can be held between outlet end of the expansion chamber and the inlet end of the reducer pipe.

The lower section of the reducer pipe includes a downwardly turned portion that terminates at the discharge end. The inner shell stops short of the outer shell such that the water flow through the water jacket merges with the exhaust gas flow through the exhaust passage at the discharge end.

A flexible pipe is connected to the discharge end of the reducer pipe and extends rearward along one side of the watercraft hull tunnel. The flexible conduit connects to an inlet section of a water trap device. The water trap device also lies within the watercraft hull on the same side of the tunnel.

The water trap device 100 has a sufficient volume to retain water and to preclude the back flow of water to the expansion chamber and the engine. Internal baffles within the water trap device 100 help control water flow through the exhaust system. The water trap device 100 is located on a side of the longitudinal vertical plane V which is opposite of the side on which a fuel pump is located, as described below.

An exhaust pipe 102 extends from an outlet section of the water trap device 100 and, as best seen in FIG. 2, wraps over the top of the tunnel to a discharge end. The discharge end desirably opens into the tunnel at an area that is close to or actually below the water level with the watercraft floating at rest on the body of water.

An induction system 78 supplies an air charge to a plurality of crankcase chambers 77 formed within the crankcase 76. Air is received by the induction system 78 through an air intake silencer 104. More particularly, air enters the air intake silencer through an air intake inlet port 106.

The air intake silencer 104 is located above and to the side of the cylinder block 60. The air intake silencer includes a plenum chamber. The plenum chamber of the silencer communicates with a plurality of throttle devices 107. The engine 32 desirably includes a number of throttle devices 107 equal in number to the number of cylinders 64. A throttle shaft 109 supports a butterfly-type valve plate 108 within a throat of the throttle device 107.

Each throttle valve 108 communicates with an intake passage of an intake manifold. The manifold is attached to the crankcase member and/or cylinder block to place each intake passage in communication with one of the crankcase chambers.

As mentioned above, a check valve (e.g., a reed valve) 110 is disposed in the inlet port of each crankcase chamber that communicates with each intake passage at the junction between the intake manifold and the crankcase member. In the illustrated embodiment, a reed valve assembly 110 includes a pair of reed valves which open upon upward movement of the piston to permit an influx of air into the corresponding crankcase chamber 77 and close upon downward movement of the piston to inhibit reverse air flow from the chamber into the intake manifold.

A charge former introduces fuel into the air charge. As will be recognized by those skilled in the art, the charge former may include either one or more carburetors or a set of fuel injectors. In the illustrated embodiment, the charge formers are fuel injectors 112 which spray fuel into the corresponding combustion chambers directly to mix with air which flows into the expansion chamber through scavenge ports in the cylinder body; however, the present fuel delivery system of the illustrated embodiment can be used with other types of charge formers and arrangement of the charge formers within the engine as well.

As best understood from FIG. 3, each fuel injector includes an influent end, and an effluent end (not shown) which is positioned within the cylinder block and in communication with the corresponding combustion chamber. The influent ends of each fuel injector include inlet ports through which the fuel injectors communicate with the fuel rail.

As schematically illustrated in FIG. 1, fuel is supplied to the fuel injectors 112 through a fuel supply system. A low pressure fuel pump 114, which is located within the fuel tank, draws fuel from the fuel tank. The low pressure fuel pump 114 can be either mechanically or electrically driven. For instance, in the illustrated embodiment, the low pressure fuel pump 114 is driven by an electric motor. The pump, however, can be a diaphragm pump operated by the changing pressure within one of the crankcase chambers.

The fuel is transferred from the low pressure fuel pump 114 through a fuel intake line 116 to a high pressure fuel pump 118. The high pressure fuel pump 118 in the illustrated embodiment of FIG. 1 is mounted on a front surface of the engine 32. Desirably, the high pressure fuel pump 118 is arranged within the engine compartment at a location higher than the outlet opening of the air duct outlet end relative to the bottom surface of the hull. The high pressure fuel pump 118 draws fuel through its influent port. The illustrated high pressure fuel pump 118 is powered by a driven pulley 119. The driven pulley 119 is driven by the flywheel assembly and drive belt 90 discussed above.

The high pressure fuel pump 118 may include an electric motor which drives an impeller shaft of the pump 118, or may be driven by the crankshaft 38, as illustrated. The impeller shaft supports an impeller that rotates in a pump cavity. In an exemplary embodiment, the pump is a centrifuge pump; however, other types of pumps, such as a rotary vane pump, can be used as well. Accordingly, either electric or mechanically powered pumps (which receive power from the output shaft of the engine) can be used.

The high pressure side of the fuel delivery system supplies fuel to the injectors 112 of the induction system. The high pressure pump pushes the fuel through a conduit 120 which is connected to a fuel rail or manifold 122. In the illustrated embodiment, a fuel filter 124 is desirably located between the high pressure fuel pump 118 and the fuel rail 122. The fuel filter separates water and other contaminants from the fuel.

The fuel rail 122 has an elongated shape and is substantially horizontally disposed. An inlet port of the fuel rail 122 communicates with the conduit 120 which carries fuel from the high pressure fuel pump 118. The inlet port opens into a manifold chamber which extends along the length of the fuel rail 122.

The fuel rail 122 delivers fuel to each fuel injector 112. For this purpose, the manifold chamber of the fuel rail 122 communicates with the plurality of supply ports defined along the length of the fuel rail 122. Each supply port receives an inlet end of the corresponding fuel injector 112 and communicates with an inlet port of the fuel injector 112 to supply the fuel injector 112 with fuel.

In the illustrated embodiment, the fuel rail 122 lies generally parallel to the direction of travel of the watercraft 10, and also to the longitudinal axis of the watercraft and the rotational axis of the crankshaft. Fuel desirably flows through the fuel rail in a direction from bow to stem in order to utilize the momentum of the fuel toward the watercraft's stern to increase the pressure within the fuel rail 122. As a result, a small size high pressure pump 118 can be used. The fuel can flow in the opposite direction, i.e., stem to bow, but this would require a larger pump.

A fuel return line 126 extends between an outlet port of the fuel rail 122 and the fuel tank 30. The return line 126 completes the flow loop through a check valve 130. Desirably, at least a portion of the return line 126 and fuel intake line 116 extends between the air duct outlet end and the air inlet of the induction system. A pressure regulator 128 is positioned at the return port of the fuel rail. The pressure regulator generally maintains a desired fuel pressure at the injectors. The regulator regulates pressure by dumping excess fuel back into the fuel tank. The excess fuel thus passes through a pressure regulator and returns to the fuel tank.

A control system manages the operation of the engine 32. As mentioned above, the electronic control unit (ECU) 73 controls ignition timing as well as other components of the engine 32, depending on the running condition of the engine. The control system includes an electronic control unit that receives signals from various sensors regarding a variety of engine functions. As schematically illustrated in FIG. 3, a crankcase position sensor senses the angular position of the crankshaft and also the speed of its rotation. The sensor produces a signal which is indicative of angular orientation and speed. In the illustrated embodiment, a pulsar coil is used for this purpose. The pulsar coil produces a signal pulse as the permanent magnets rotate across the coil. The ECU uses this signal to determine the specific crankshaft angle at any given time. Another sensor determines the throttle orientation to determine the opening degree of the throttle valves. The sensor produces a signal indicative of the throttle valve position.

The ECU receives these signals from the sensors to control injection timing and duration, as well as spark timing. For this purpose, the ECU communicates with each fuel injector. The ECU controls the operation of the solenoid in order to manage fuel injection timing and duration, the latter affecting the fuel/air ratio of the produced charge. The desired stoichiometric fuel/air ratio will depend upon the amount of air flow into the engine 32, which is a function of the opening degree of the throttle valve. This information is stored within a memory device with which the ECU communicates. The ECU thus processes the information signal received from the throttle valve sensor and determines the amount of fuel to be injected for the sensed operating condition of the engine. The ECU also uses the information from the crankshaft sensor to determine the point during the engine's revolution to initiate fuel injection.

In addition to controlling fuel injection, the ECU also controls ignition timing. For this purpose, the ECU controls a capacitor discharge ignition unit, and the firing of the spark plugs. The generator powers one or more charging coil which increases the voltage of the charge eventually delivered to the spark plugs. The generator also charges one or more batteries, as known in the art. The capacitor discharge unit desirably controls the discharge of one ignition coil for each spark plug. The capacitor discharge ignition unit receives a signal from the ECU which manages the discharge timing. The ignition system also includes a capacitor discharge ignition circuit (CDI) which is charged by the output of a conventional charging coil. The discharge of a CDI capacitor generates a voltage in an ignition coil associated with each spark plug.

The arrangement of the components of the engine, engine control system, fuel supply system and exhaust system are illustrated in FIGS. 1 through 3. The high pressure fuel pump desirably lies between the front end of the engine and the main fuel tank. The high pressure fuel pump thus desirably lies in an air flow stream between the air duct and the induction system. The air flow over the fuel pump cools the pump and the fuel passing through the pump. As a result, the fuel pump runs cooler and the durability and life-span (i.e., durability) of the pump tends to increase.

In the illustrated embodiment of FIGS. 1 through 3, the air duct is positioned to lie on a longitudinal center line L of the watercraft hull 10. As seen from FIG. 1, the position of the front air duct desirably lies behind the main fuel tank 30 for ventilation purposes. Notably, the position of the front air duct can be located either in front of or behind the fuel tank.

FIGS. 4 through 7 illustrate another embodiment of a watercraft having aspects of the present invention. The elements in FIGS. 4 through 7 which correspond to the elements in FIGS. 1 through 3 have been numbered using like numbers. In addition, the description relating to the first embodiment should be considered to apply to the embodiment of FIGS. 4 through 7 except where noted. The engine in the illustrated embodiment of FIGS. 4 through 7 has been oriented with the cylinders in a generally upright position. The exhaust system is arranged to one side of a longitudinal vertical plane, V, while the induction system has been arranged to lie on the other side of the longitudinal vertical plane. In addition, the flywheel is separated from the generator 83. The flywheel (not shown) remains at the front portion of the engine 32 while the generator 83 has been moved to the rear of the engine 32 as discussed below.

Figure 5:
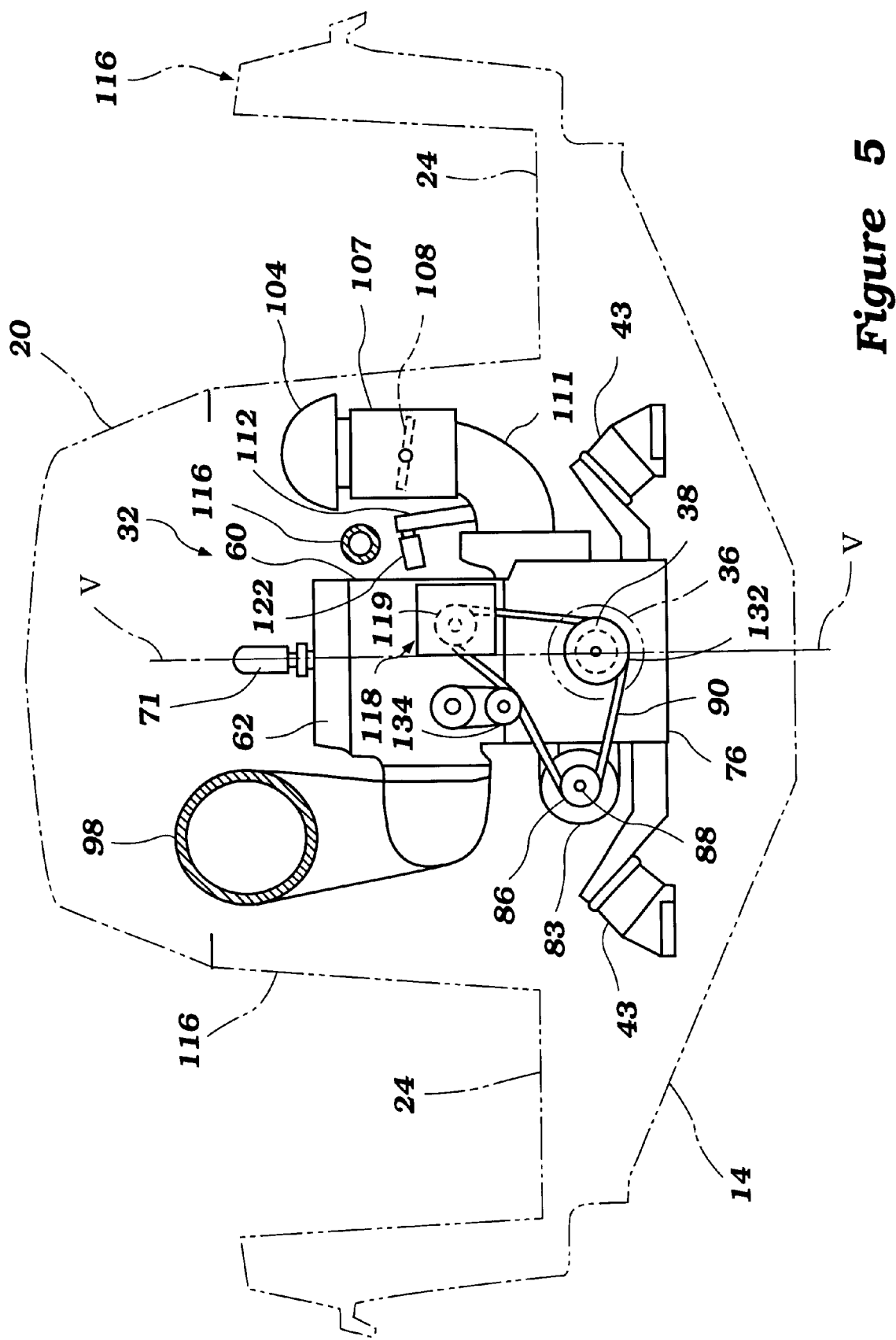
FIG. 5 is a rear elevational view of the engine of FIG. 4, and illustrates a hull of the watercraft in phantom to show the relative location of the engine within the hull.
Figure 6:
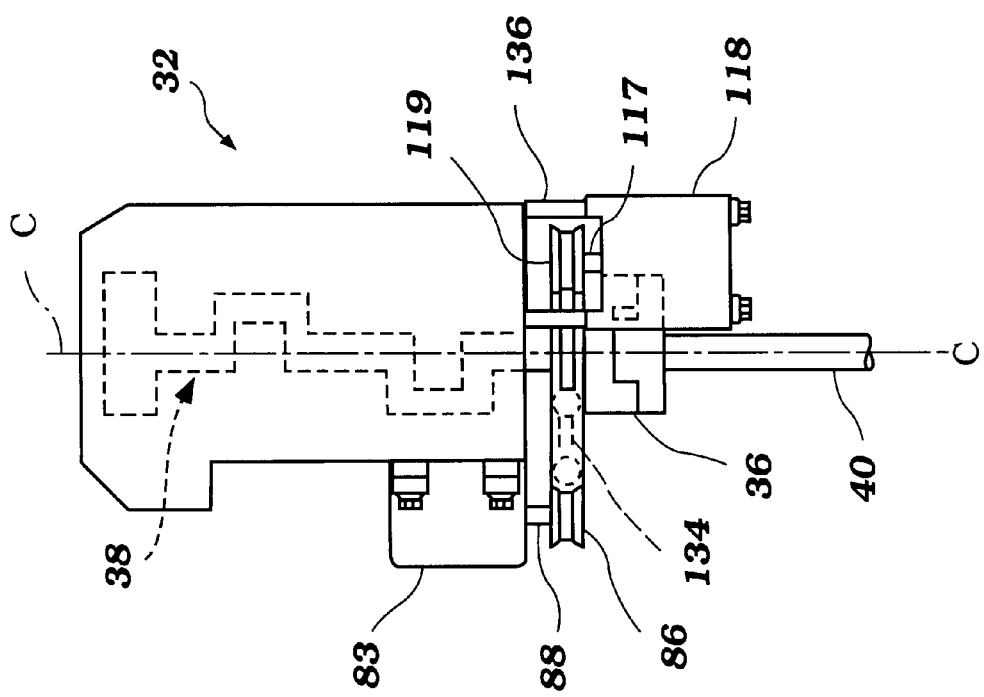
FIG. 6 is a bottom plan view of the engine of FIG. 5 and illustrates a fuel pump and a generator that are driven by an output shaft of the engine.

The fuel system is substantially the same as in the first embodiment with a few minor modifications. The fuel intake line 116 now extends from the low pressure fuel pump 114 located in the gas tank 30 to the high pressure pump 118. The high pressure fuel pump 118 is located at the rear of the engine 32 in the embodiment of FIGS. 4 through 7. The high pressure fuel pump 118 is mounted to the cylinder block 60 through the use of support brackets 136 (FIG. 6). The positioning of the high pressure fuel pump 118 also falls to the induction side of a vertical longitudinal center plane, V, as shown in FIG. 5. The fuel rail 122 and the fuel intake line both extend substantially parallel to the longitudinal vertical plane, V. In addition, both are located between the cylinder block 60 and the air intake silencer 104 of the induction system. Thus, the fresh air enters the engine compartment through air duct 31. The air travels down to the lower outlet opening 37. The air then is pulled into the air intake inlet port 106 of the air intake silencer 104. The high pressure fuel pump 118 is thus located in the air stream as it flows from the lower outlet opening 37 to the air intake inlet port 106.

As shown in FIG. 5, the crankshaft 38 powers a drive pulley 132. The drive pulley 132 powers a driven pulley 86 coupled to an input shaft 88 of the generator 83. The generator is now moved to the left of the longitudinal vertical plane, V, and is arranged to be slightly above the height of the crankshaft 38. The driven pulley 86 also powers the driven pulley 119 of the high pressure fuel pump 118. A single belt 90 thus powers both the generator 83 and the high pressure fuel pump 118. A tensioner 134 is located along the belt 90 to provide the necessary tension in the belt.

Figure 7:
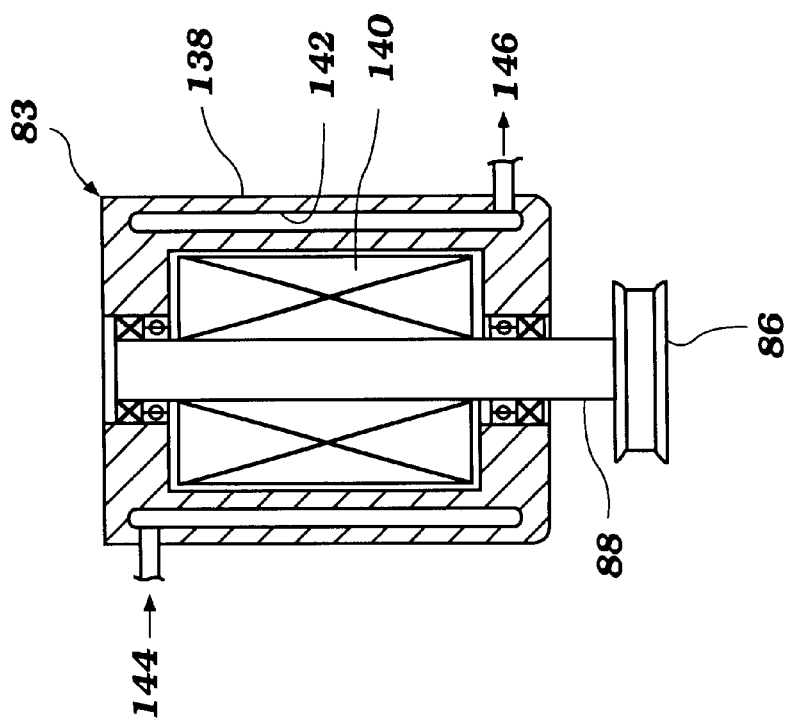
FIG. 7 is a cross-sectional view of the generator of FIG. 6.

FIG. 7 illustrates the cooling jacket 142 arranged around the generator 38. The cooling jacket 142 may be configured in series or parallel to the cooling system of the engine and exhaust systems described above. As shown, a cylindrical casing 138 substantially encloses the generator coil 140 of the generator 38. The cylindrical casing 138 is provided with an inlet 144 through which coolant or cooling water may enter the cooling jacket 142 which surrounds the generator coil 140 of the generator 83. The coolant flows through the cooling jacket to an outlet 146. The outlet 146 allows the coolant to exit the cooling jacket 142. Thus, the cooling water flows around the generator coil 140 through coolant jacket 142.

Figure 8:
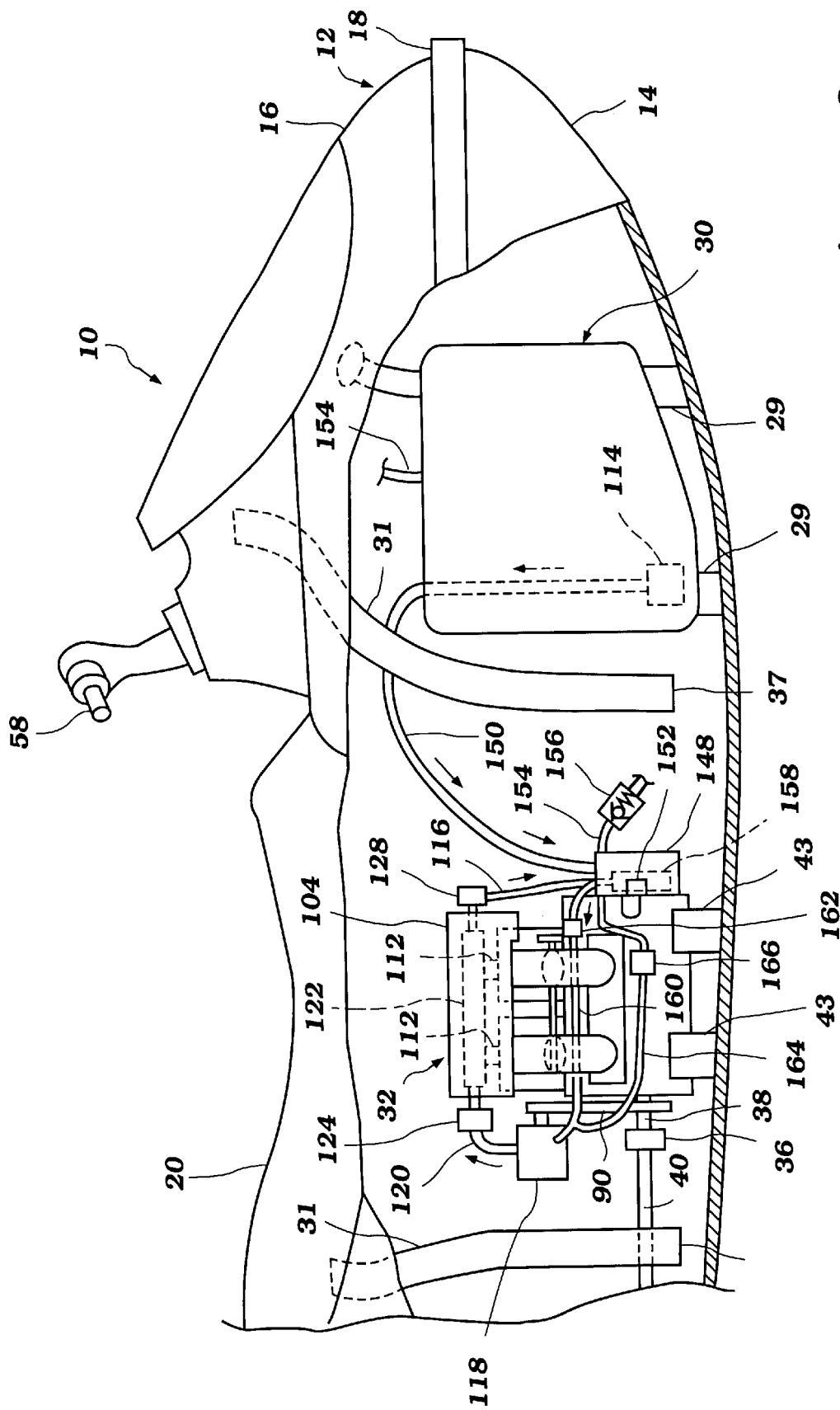
FIG. 8 is a side elevational view of the small watercraft that is partially sectioned to illustrate an engine and a fuel supply system that are configured and arranged in accordance with an additional preferred embodiment of the present invention.
Figure 9:
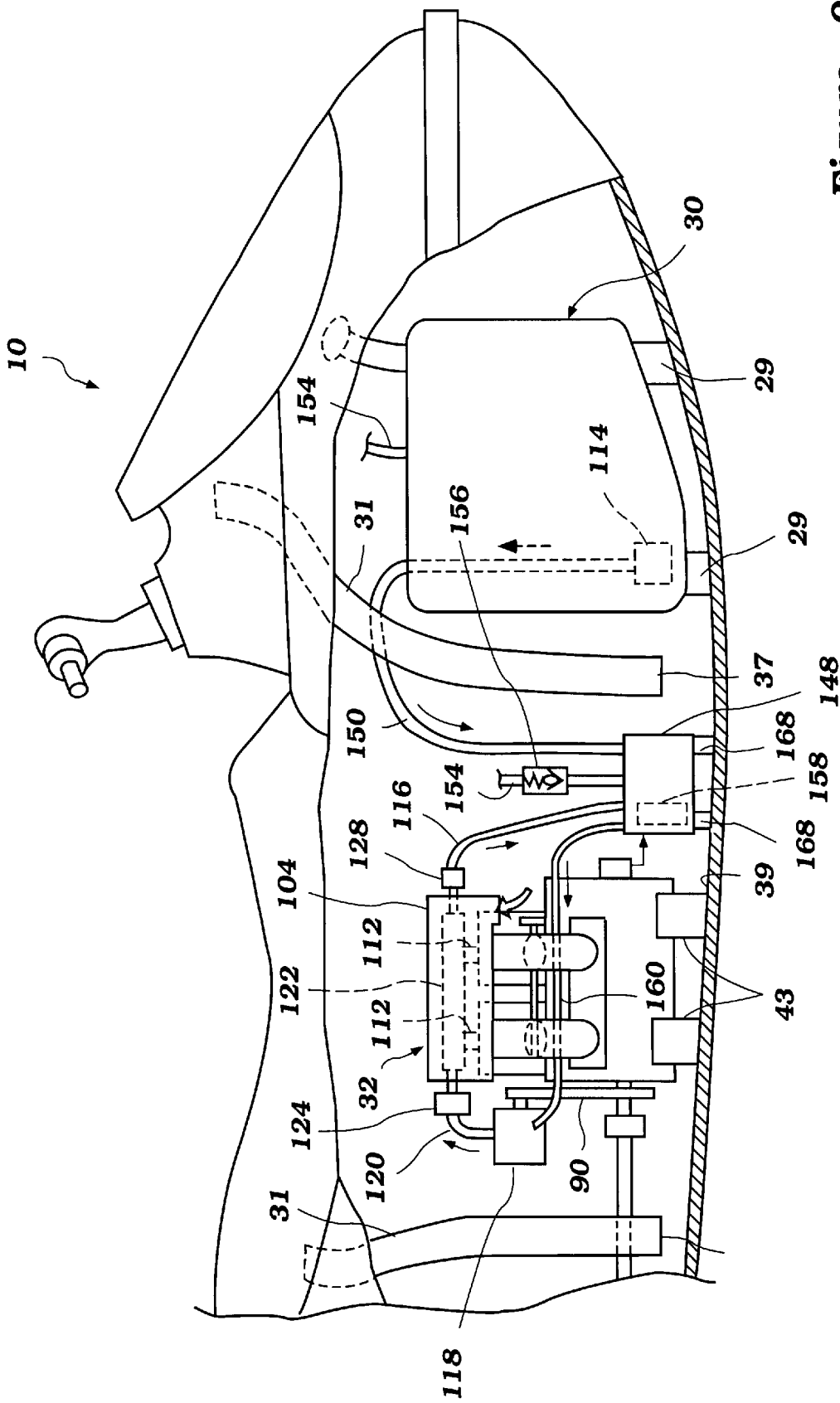
FIG. 9 is a side elevational view of a small watercraft that is partially sectioned to illustrate an engine and a fuel supply system that are configured and arranged in accordance with a further preferred embodiment of the present invention.

FIGS. 8 and 9 illustrate another embodiment configured and arranged in accordance with the present invention. The watercraft hull 12 and ventilation system, as well as the engine 32, are substantially similar to the embodiments described above. Accordingly, similar reference numerals have been used to indicate like components between the embodiments. This embodiment, however, includes a variation of the fuel supply system disclosed in the previous embodiments.

The fuel supply system illustrated in FIGS. 8 and 9 includes a main fuel tank 30 and a vapor separator 148. A first delivery line 150 connects a low pressure fuel pump 114, which lies within the main fuel tank 30, to the vapor separator 148.

The vapor separator 148 has a substantially smaller volume capacity than the main fuel tank 30. In the illustrated embodiment, the vapor separator has a fuel capacity of about 1 liter. Although not illustrated, a conventional float mechanism is employed within the vapor separator 148 so as to regulate the flow of fuel from the main fuel tank 30 to the vapor separator 148.

A lubricant pump 150 supplies lubricant (e.g., oil) to the vapor separator. As a result, the oil mixes with the fuel before the fuel is injected into the engine 32. The oil pump 150 desirably meters oil into the vapor separator 148 at a rate corresponding to the operating condition of the engine 32. In the illustrated embodiment, the oil pump 150 comprises a diaphragm valve which operates on pressure fluctuations within the front crankcase chamber. Alternatively, the oil pump 150 can be actuated by throttle movement, as known in the art.

A vapor delivery line 154 connects to an upper portion of the vapor separator 148. The effluent end of the vapor delivery line 154 is connected to either the fuel tank 30 or to the induction system of the engine 32 so as to introduce fuel vapor into at least a portion of the air flow through the intake pipes. The fuel vapor is thereby introduced into the combustion chamber through the scavenge ports with the air flow. A check valve 156 desirably operates within the vapor delivery line 154 so as to regulate vapor flow through the line 154.

A second low pressure fuel pump 158 communicates with the vapor separator 148. In the illustrated embodiment, the fuel pump 158 is located within the vapor separator 148 and is submergible therein. An effluent port of the second fuel pump 158 is connected to a pre-pressurized fuel supply line 160. This line 160 extends between the low pressure fuel pump 158 and the high pressure fuel pump 118 located on the rear side of the engine 32. A water separator filter 162 desirably lies within the pre-pressurized fuel supply line 160 so as to remove water and other contaminants from the fuel. A secondary return line 164 is connected to the pre-pressurized fuel line 160 just upstream of the high pressure fuel pump 118. The secondary return line 164 is also connected to the vapor separator 148 to provide a return passage from the pre-pressurized fuel line 160 to the vapor separator 148. A pressure regulator 166 is located within this return line 164 so as to maintain the pressure within the return line 164 and the pre-pressurized fuel supply line 160 at a desired pressure at the inlet port of the high pressure fuel pump 118.

Figure 4:
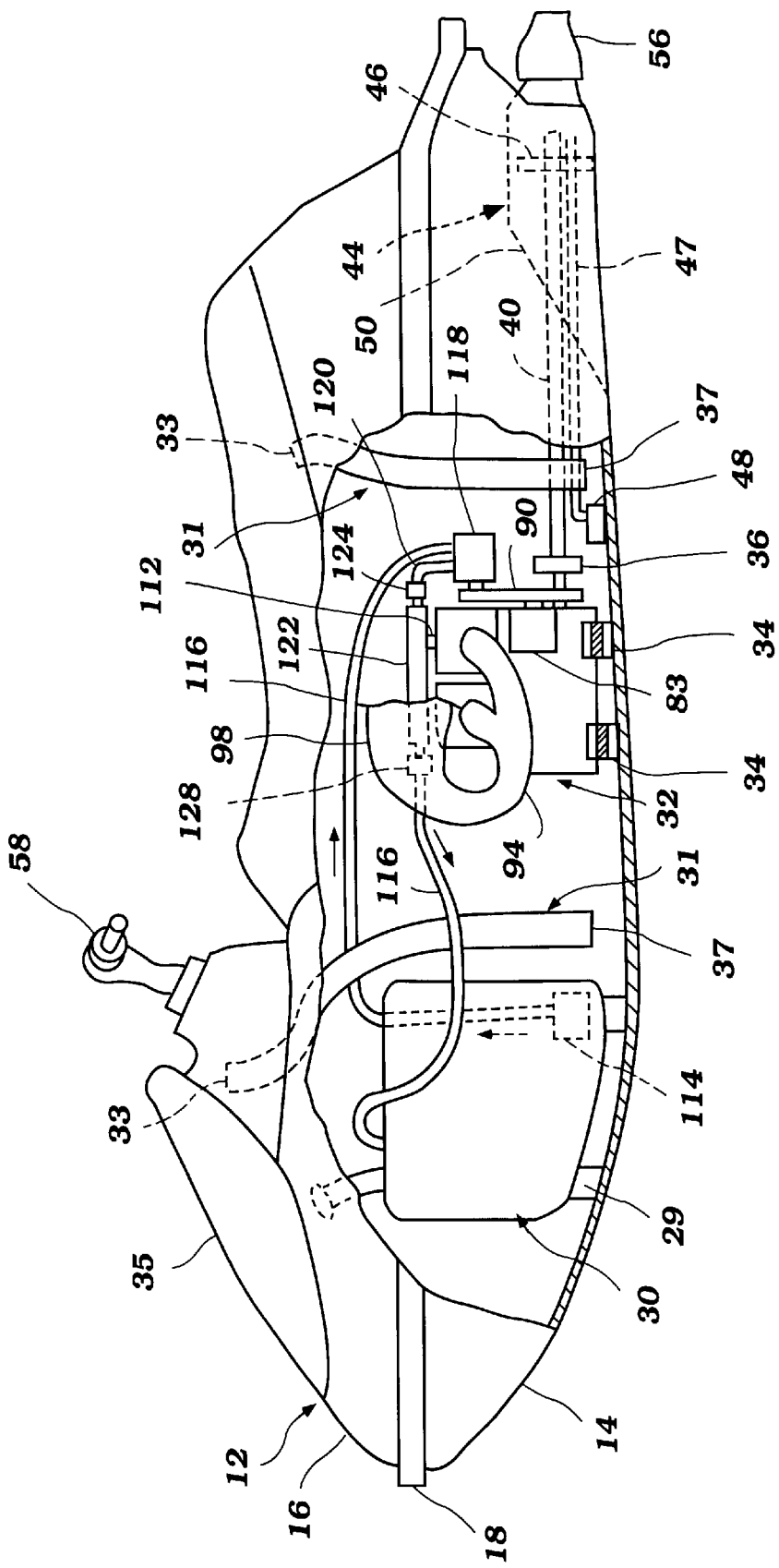
FIG. 4 is a side elevational view of the small watercraft that is partially sectioned to illustrate an engine and a fuel supply system that are configured and arranged in accordance with another preferred embodiment of the present invention.

The balance of the fuel supply system is substantially similar to that described above in connection with the embodiment illustrated in FIG. 4. A first delivery line 120 extends from the high pressure pump to a fuel rail 122. A fuel filter 124 is disposed within the delivery line 120, again to remove contaminants (e.g., water and vapor) from the fuel entering the fuel rail 122. The fuel rail 122 in turn is connected to the influent ports of the fuel injectors 112. In the illustrated embodiment, the fuel rail 122 extends in a direction which is generally parallel to the rotational axis of the crankshaft 38, and extends along an upper portion of the cylinder head. A pressure regulator operates at the downstream end of the fuel rail 122. The pressure regulator 128 in the illustrated embodiment lies on the front side of the engine. A return line 116 connects the pressure regulator to the vapor separator 148 so as to close the fuel loop defined between the vapor separator 148, the high pressure fuel pump 118 and the fuel rail 122.

FIG. 9 discloses an embodiment which is substantially similar to that disclosed in FIG. 8. Accordingly, the foregoing description of the fuel supply system, as well as the engine and other components of the previous embodiments, shall apply equally to the embodiment illustrated in FIG. 9, except where noted otherwise. As seen in FIG. 9, the vapor separator 148 is positioned in front of the engine 32. Vibration absorbent mounts 168 support the vapor separator 148 above the bottom floor 39 of the hull. In this position, the vapor separator 148 lies near the outlet end 37 of the air duct 31. In this position, it also lies between the outlet opening 37 and an inlet opening of the induction system 104. As a result, air flows from the air duct outlet opening 37 across the vapor separator 148 and into the induction system 104 so as to cool at least a portion of the fuel delivery line in which the vapor separator 148 is located A pre-pressurized fuel line 160 connects the low pressure fuel pump 158 to the high pressure pump 118. Again, the low pressure fuel pump 158 is submerged within the fuel contained in the vapor separator enclosure 148. In this embodiment, however, the fuel supply system does not include a secondary return line as disclosed in the embodiment of FIG. 8.

Figure 10:
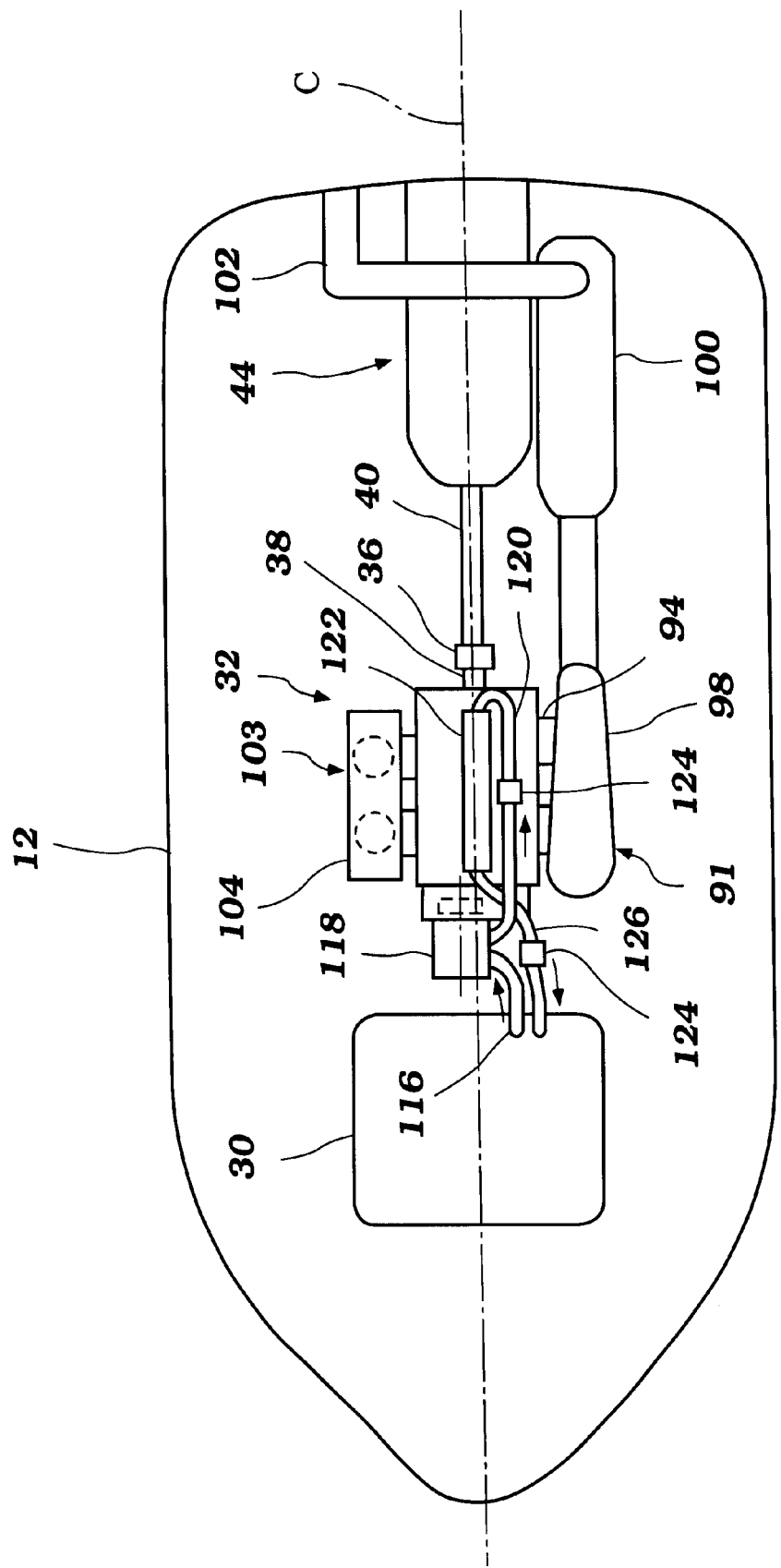
FIG. 10 is a top plan view of an engine, fuel supply system and exhaust system for a small watercraft configured and arranged in accordance with an additional embodiment of the present invention.

FIG. 10 illustrates an additional embodiment of the present fuel supply system. In this embodiment, the high pressure fuel pump 118 is located on the front side of the engine 32. The fuel pump 118 also is desirably located principally to one side of a longitudinal center line C that extends between the bow and the stern of the watercraft. The exhaust system lies on the opposite side of the longitudinal center line, C, with both the expansion chamber 98 and the water trap 100 completely positioned on the side of the center line C. As a result, the high pressure fuel pump 118 is spaced apart from the exhaust system 91.

Figure 11:
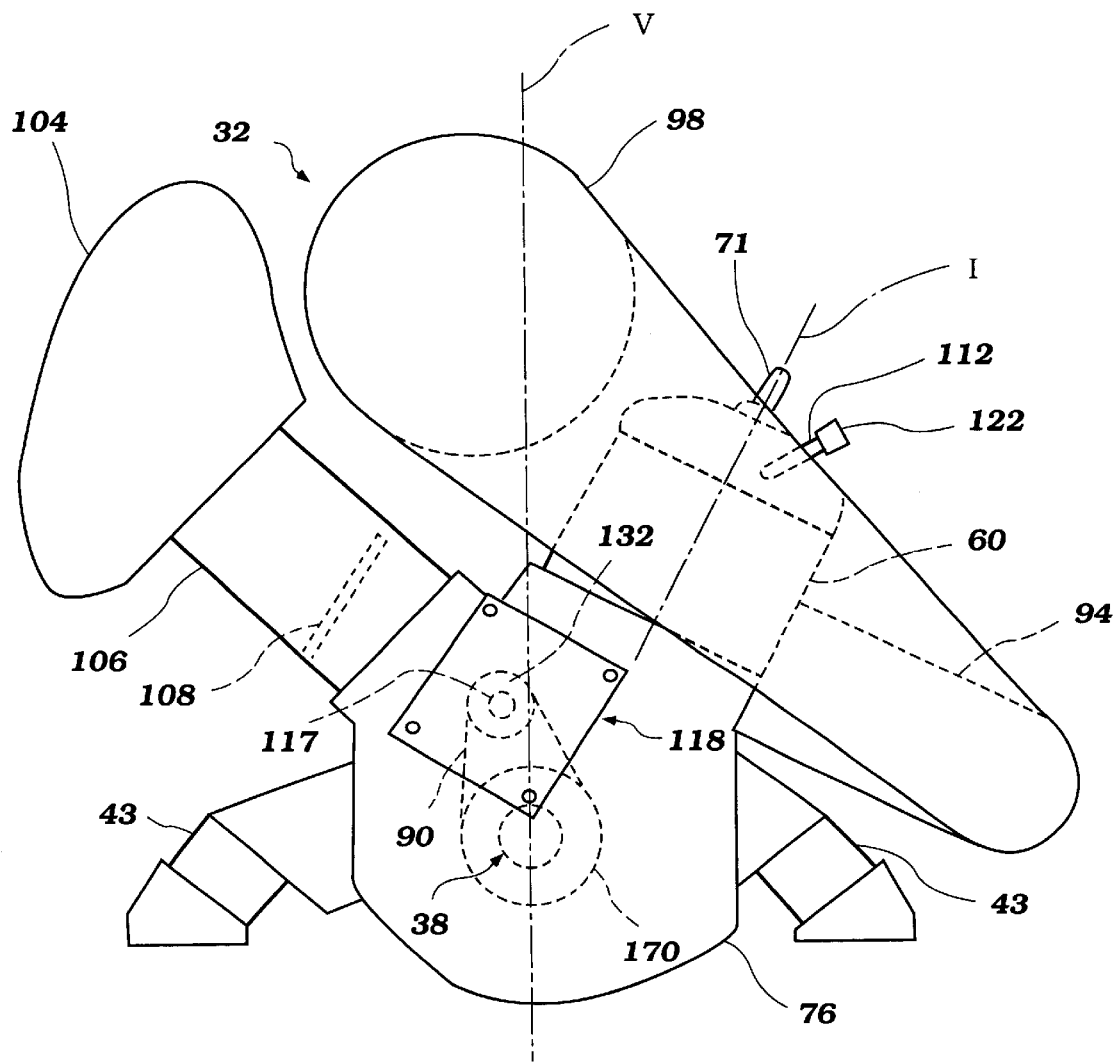
FIG. 11 is a front elevational view of an engine and fuel supply system for a small watercraft configured and arranged in accordance with another preferred embodiment of the present invention.

FIG. 11 illustrates another embodiment of the fuel supply system and the arrangement of the fuel pump 118 on the engine. In this embodiment, the fuel pump 118 is mounted on the front side of the engine 32 and is driven by a dedicated drive mechanism. The drive mechanism includes a drive pulley 170 and a driven pulley 132 with a drive belt 90 extending therebetween. The driven pulley 132 is supported on the end of a drive shaft which powers the high pressure fuel pump 118. The drive shaft 117 rotates about an axis which is arranged to one side of the vertical plane V and which lies generally parallel to the rotational axis about which the crankcase 38 rotates. The cylinders of the engine 32 are canted toward the opposite side of the longitudinal vertical plane V.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A small watercraft having a hull defining an engine compartment, an internal combustion engine being located within the engine compartment and driving a propulsion device which is carried by the hull, at least one air duct communicating with the engine compartment through at least one outlet opening, an induction system connected to the engine and including an air inlet, and a fuel supply system including a fuel delivery line and a fuel return line that communicate with a first fuel tank and together define a fuel loop, said fuel delivery and return lines being arranged within the hull of the watercraft such that at least a portion of one of said lines extends between the air duct outlet operating and the air inlet of the induction system and a fuel rail communicating with the fuel loop and with a plurality of fuel injectors mounted in the engine.

2. A small watercraft as in claim 1, wherein said portion of one of the lines extends in a direction generally parallel to an axis about which an output shaft of the engine rotates.

3. A small watercraft as in claim 1, additionally comprising a fuel pump arranged within the portion of one of the lines so as to lie between the air duct outlet opening and the air inlet of the induction system.

4. A small watercraft as in claim 3, wherein the fuel rail is arranged within the fuel loop between the fuel delivery and return lines.

5. A small watercraft as in claim 4, wherein said fuel pump is located within the fuel delivery line upstream of the fuel rail.

6. A small watercraft as in claim 1 additionally comprising a plurality of shock-absorbent engine mounts that couple the engine to the hull.

7. A small watercraft as in claim 6, wherein said fuel supply system comprises a fuel pump to circulate fuel at least through a portion of the fuel loop, and said fuel pump is arranged within the engine compartment at a location higher than the outlet opening of said air duct relative to a bottom surface of the hull.

8. A small watercraft as in claim 7 additionally comprising a bilge system including an inlet located within the engine compartment, and the fuel pump being arranged within the engine compartment at a location higher than the inlet of the bilge system relative to a bottom surface of the hull.

9. A small watercraft as in claim 8, wherein said engine includes an output shaft that rotates about a longitudinal axis that extends generally between a bow and a stern of the hull, and the fuel pump is positioned on a bow side of the engine.

10. A small watercraft as in claim 9, wherein at least a portion of the fuel pump lies between the outlet opening of the air duct and the air inlet of the engine induction system.

11. A small watercraft as in claim 8, wherein said fuel pump is mounted to the engine.

12. A small watercraft as in claim 1, wherein the fuel supply system includes a fuel pump that is driven by an output shaft of the engine.

13. A small watercraft as in claim 1 additionally comprising a second fuel tank which is in communication with the first fuel tank to supply fuel thereto, and said first fuel tank communicates with the engine induction system, independent of the fuel supply system, to introduce fuel vapors into at least a portion of the air flow through the induction system.

14. A small watercraft having a hull defining a rider's area behind a bow of the hull which is sized to accommodate at least one rider, an internal combustion engine located in an engine compartment defined within the hull and including an output shaft which drives a drive shaft of a propulsion device carried by the hull, a plurality of shock-absorbent engine mounts supporting the engine within the engine compartment, and a fuel supply system including a first fuel tank connected to a fuel delivery line and a fuel return line that together define a fuel loop, a fuel pump that communicates with the fuel loop, the fuel pump being mounted on the engine, and a fuel rail communicating with the fuel pump and with a plurality of fuel injectors mounted in the engine.

15. A small watercraft as in claim 14, wherein the fuel rail is arranged within the fuel loop between the fuel delivery and return lines.

16. A small watercraft as in claim 15, wherein said fuel pump is located within the fuel delivery line upstream of the fuel rail.

17. A small watercraft as in claim 14, wherein said output shaft rotates about a longitudinal axis that extends generally between the bow and a stem of the hull, and the fuel pump is positioned on the bow side of the engine.

18. A small watercraft as in claim 14, wherein the fuel pump is driven by the output shaft of the engine.

19. A small watercraft as in claim 18 additionally comprising a generator, the generator and the fuel pump being arranged such that at least a portion of the generator lies on one side of a vertical plane that includes a rotational axis about which the engine output shaft rotates, and at least a portion of the fuel pump lies on the other side of the vertical plane.

20. A small watercraft as in claim 19 additionally comprising at least one air duct communicating with the engine compartment through at least one outlet opening, the outlet opening of the air duct being positioned lower than the generator relative to a bottom surface of the hull.

21. A small watercraft as in claim 20 additionally comprising a bilge system including at least one inlet opening arranged within the engine compartment, the inlet opening of the bilge system being positioned lower than the generator relative to a bottom surface of the hull.

22. A small watercraft as in claim 14 additionally comprising an exhaust system communicating with the engine and extending to a discharge end so as to expel engine exhaust gases from the engine compartment, the exhaust system including a water lock positioned between the engine and the discharge end and arranged within the hull on a side of a longitudinal vertical plane, which contains an axis about which the output shaft rotates, opposite of a side on which the fuel pump is positioned.

23. A small watercraft as in claim 14, wherein said engine includes at least one inclined cylinder having an axis which is skewed relative to a vertical plane that contains an axis about which the engine output shaft rotates.

24. A small watercraft as in claim 14 additionally comprising a second fuel tank in communication with the first fuel tank, and the second fuel tank is larger than the first fuel tank.

25. A small watercraft as in claim 24, wherein the first fuel tank is located between the second fuel tank and the fuel pump.

26. A small watercraft as in claim 25, wherein another fuel pump is located within the first fuel tank.

27. A small watercraft as in claim 25, wherein another fuel pump is located within the second fuel tank.

28. A small watercraft as in claim 27, wherein the fuel pump that supplies fuel to the fuel injectors is controlled such that its operation corresponds to an operating condition of the engine, and the another fuel pump operates independent of the operating condition of the engine.

29. A small watercraft as in claim 25, wherein the first fuel tank communicates with an engine induction system, independent of the fuel supply system, to introduce fuel vapors into a least a portion of the air flowing through the induction system.

30. A small watercraft having an internal combustion engine and a propulsion device driven by the engine for propelling the watercraft, the engine including a fuel injection system having a plurality of fuel injectors and a fuel supply system for delivering fuel to a high-pressure fuel pump and a fuel rail that delivers fuel to the fuel injectors for injection into the engine, the fuel supply system including a return conduit for return of fuel from the fuel rail to a fuel tank for maintaining a desired pressure in the fuel rail, a first portion of a fuel supply line extending to the high-pressure fuel pump being disposed so as to extend in a downward direction to the high-pressure fuel pump.

31. A small watercraft as in claim 30, wherein substantially all of the first portion of the fuel supply line extending from the fuel tank to the high-pressure fuel pump is disposed in a downward direction to the high-pressure fuel pump.

32. A small watercraft as in claim 30 additionally comprising a second fuel pump, the fuel supply line being disposed between the second fuel pump and the high-pressure fuel pump.

33. A small watercraft as in claim 32, wherein the second fuel pump is disposed within the fuel tank.

34. A small watercraft as in claim 33 additionally comprising a second portion of the fuel supply line extending from the second fuel pump to the first portion of the fuel supply line.

35. A small watercraft as in claim 34, wherein the second portion of the fuel supply line extends substantially vertically between the second fuel pump and the first portion of the fuel supply line.

36. A small watercraft as in claim 30, wherein the high-pressure fuel pump is disposed on a forward end of the engine.

37. A small watercraft as in claim 30, wherein the high-pressure fuel pump is disposed on the rearward end of the engine.

* * * * *

UNITED STATES PATENT AND TRADEMARK OFFICE
CERTIFICATE OF CORRECTION

PATENT NO. : 6,244,915 B1
DATED : June 12, 2001
INVENTOR(S) : Ozawa

It is certified that error appears in the above-identified patent and that said Letters Patent is hereby corrected as shown below:

Column 15,
Line 9, change "operating" to -- opening --.

Signed and Sealed this

Twenty-seventh Day of July, 2004

JON W. DUDAS
*Acting Director of the United States Patent and Trademark Office*